(12) United States Patent
Mori et al.

(10) Patent No.: US 9,238,197 B2
(45) Date of Patent: *Jan. 19, 2016

(54) EXHAUST GAS PURIFICATION FILTER, AND METHOD FOR PRODUCING SAME

(75) Inventors: Hiroyoshi Mori, Tokushima (JP); Takahiro Mishima, Tokushima (JP); Masaaki Fukuda, Tokushima (JP); Sachio Fukuoka, Tokushima (JP)

(73) Assignee: OTSUKA CHEMICAL CO., LTD., Osaka-shi (JP)

( * ) Notice: Subject to any disclaimer, the term of this patent is extended or adjusted under 35 U.S.C. 154(b) by 211 days.

This patent is subject to a terminal disclaimer.

(21) Appl. No.: 13/822,243

(22) PCT Filed: Sep. 22, 2011

(86) PCT No.: PCT/JP2011/071588
§ 371 (c)(1),
(2), (4) Date: Mar. 11, 2013

(87) PCT Pub. No.: WO2012/046577
PCT Pub. Date: Apr. 12, 2012

(65) Prior Publication Data
US 2013/0171036 A1 Jul. 4, 2013

(30) Foreign Application Priority Data
Oct. 4, 2010 (JP) ................ 2010-224532

(51) Int. Cl.
*B01D 50/00* (2006.01)
*C04B 35/00* (2006.01)
(Continued)

(52) U.S. Cl.
CPC ............. *B01D 53/94* (2013.01); *B01D 53/944* (2013.01); *B01J 21/063* (2013.01); *B01J 21/066* (2013.01);
(Continued)

(58) Field of Classification Search
CPC . B01J 21/063; B01J 35/003; C04B 35/62685; C04B 2235/3217; C04B 2235/3234; B01D 2255/20707; B01D 2255/915; F01N 2330/14
USPC ............ 422/177, 180; 501/134, 135; 264/628
See application file for complete search history.

(56) References Cited

U.S. PATENT DOCUMENTS 5,846,276 A * 12/1998 Nagai et al. .................... 55/523
6,620,751 B1   9/2003 Ogunwumi
(Continued)

FOREIGN PATENT DOCUMENTS

CN         1642872 A    7/2005
DE     19626375 A1    1/1997
(Continued)

OTHER PUBLICATIONS

Extended European Search Report dated Nov. 10, 2014, issued in corresponding European Application No. 11830510.1.(8 pages).
(Continued)

*Primary Examiner* — Tom P Duong
(74) *Attorney, Agent, or Firm* — Westerman, Hattori, Daniels & Adrian, LLP

(57) ABSTRACT

Provided are an exhaust gas purification filter having a high particulate matter (PM) combustion efficiency, a low coefficient of thermal expansion, and superior thermal resistance and a method for producing the same. An exhaust gas purification filter is formed by sintering columnar aluminum titanate particles whose surfaces have a catalyst material deposited thereon and which have an average aspect ratio (=number average major-axis length/number average minor-axis length) of 1.3 or more, wherein a catalyst made from the catalyst material by thermal treatment during the sintering is supported on the surface of the aluminum titanate.

7 Claims, 11 Drawing Sheets

(51) Int. Cl.
*B28B 1/00* (2006.01)
*B01D 53/94* (2006.01)
*B01J 37/08* (2006.01)
*B01J 35/00* (2006.01)
*B01J 21/06* (2006.01)
*B01J 21/14* (2006.01)
*B01J 23/02* (2006.01)
*B01J 35/04* (2006.01)
*B01J 37/00* (2006.01)
*C04B 35/478* (2006.01)
*C04B 35/626* (2006.01)
*C01G 23/00* (2006.01)
*B01J 21/16* (2006.01)

(52) U.S. Cl.
CPC *B01J 21/14* (2013.01); *B01J 23/02* (2013.01); *B01J 35/002* (2013.01); *B01J 35/0006* (2013.01); *B01J 35/04* (2013.01); *B01J 37/0009* (2013.01); *B01J 37/0036* (2013.01); *B01J 37/08* (2013.01); *C01G 23/003* (2013.01); *C04B 35/478* (2013.01); *C04B 35/62685* (2013.01); *B01D 2255/202* (2013.01); *B01D 2255/204* (2013.01); *B01D 2255/2092* (2013.01); *B01D 2255/20707* (2013.01); *B01D 2255/20715* (2013.01); *B01D 2255/30* (2013.01); *B01D 2255/915* (2013.01); *B01D 2258/012* (2013.01); *B01J 21/16* (2013.01); *C01P 2002/72* (2013.01); *C01P 2004/03* (2013.01); *C01P 2004/12* (2013.01); *C01P 2004/54* (2013.01); *C01P 2004/61* (2013.01); *C04B 2235/3201* (2013.01); *C04B 2235/3206* (2013.01); *C04B 2235/3213* (2013.01); *C04B 2235/3217* (2013.01); *C04B 2235/3232* (2013.01); *C04B 2235/3234* (2013.01); *C04B 2235/3418* (2013.01); *C04B 2235/5296* (2013.01); *C04B 2235/787* (2013.01); *C04B 2235/80* (2013.01); *C04B 2235/96* (2013.01); *C04B 2235/9607* (2013.01); *F01N 2330/14* (2013.01)

(56) References Cited

U.S. PATENT DOCUMENTS

| 8,859,447 B2* | 10/2014 | Itoi et al. ............... 501/134 |
| 2007/0006561 A1 | 1/2007 | Brady et al. |
| 2007/0020155 A1* | 1/2007 | Ohno et al. ............... 422/177 |
| 2009/0004078 A1 | 1/2009 | Mao et al. |
| 2009/0092786 A1 | 4/2009 | Liu et al. |
| 2009/0155134 A1 | 6/2009 | Li |
| 2010/0247406 A1 | 9/2010 | Ohno et al. |
| 2010/0248951 A1 | 9/2010 | Ohno et al. |

FOREIGN PATENT DOCUMENTS

| EP | 2202211 A1 | 6/2010 |
| EP | 2266932 A1 | 12/2010 |
| JP | 01-249657 A | 10/1989 |
| JP | 08-290963 A | 11/1996 |
| JP | 09-029023 A | 2/1997 |
| JP | 2009-000663 A | 1/2009 |
| JP | 2010-116290 A | 5/2010 |
| JP | 2010/143494 A1 | 12/2010 |
| JP | 2010/146954 A1 | 12/2010 |
| JP | 2011-005417 A | 1/2011 |
| WO | 2009/119748 A1 | 10/2009 |
| WO | 2010/143493 A1 | 12/2010 |
| WO | 2010/143494 A1 | 12/2010 |

OTHER PUBLICATIONS

Notification of Transmittal of Translation of the International Preliminary Report on Patentabililty (Form PCT/IB/338) of International Application No. PCT/JP2011/071588 mailed May 16, 2013 with Forms PCT/IB/373 and PCT/ISA/237.

Office Action dated Apr. 30, 2014, isued in Chinese Patent Application No. 201180048195.1 with English Translation (14 pages).

International Search Report of PCT/JP2011/071588, mailing date of Jan. 10, 2012.

* cited by examiner

EXHAUST GAS PURIFICATION FILTER, AND METHOD FOR PRODUCING SAME

TECHNICAL FIELD

This invention relates to an exhaust gas purification filter using aluminum titanate and a method for producing the same.

BACKGROUND ART

Diesel particulate filters (DPFs) and the like are conventionally used for removal of particulate matter (PM) contained in exhaust gases discharged from internal combustion engines, particularly diesel engines. The combustion temperature of PM is as high as 550° C. to 650° C., so that high temperature is required to burn PM. Therefore, as a porous material used in a DPF and the like, a material is desired which has low thermal expansivity and superior thermal shock resistance to avoid the occurrence of fatigue due to thermal shock within the operating temperature range. Aluminum titanate meets these performance demands and has a high melting point. For this reason, aluminum titanate has been expected as a porous material used such as for a DPF and developed in various ways.

Meanwhile, since the combustion of PM requires high temperature, attention is being paid to a method in which a catalyst is supported on a DPF to steadily combust PM at low temperature. The supporting of the catalyst is performed, after the production of the DPF, by impregnating the DPF with a solution containing catalyst particles or applying the solution to the DPF, so that a catalyst layer is formed on the wall surfaces of the DPF and in the pores of the DPF walls. However, there arises a problem in that some of the pores are clogged by the catalyst layer so that pores having been previously interconnected are isolated from one another to reduce the number of exhaust gas flow channels, resulting in reduced PM combustion efficiency.

Patent Literature 1 proposes that in order to provide a sintered aluminum titanate body having not only high strength without impairing high melting point and low thermal expansivity characteristics possessed by aluminum titanate but also less degradation in mechanical strength due to repeated thermal history, a substance formed by adding magnesium oxide and silicon oxide to aluminum titanate is sintered.

Patent Literature 2 discloses the production of an exhaust gas filter using columnar aluminum titanate and proposes to produce the exhaust gas filter in which, when the columnar aluminum titanate particles have a negative coefficient of thermal expansion in the longitudinal direction, they have a positive coefficient of thermal expansion in the direction perpendicular to the longitudinal direction or in which, when the columnar particles have a positive coefficient of thermal expansion in the longitudinal direction, they have a negative coefficient of thermal expansion in the direction perpendicular to the longitudinal direction. However, the literature does not disclose a specific method for manufacturing columnar aluminum titanate. Furthermore, the literature also does not disclose specific shape features of the columnar aluminum titanate, such as the aspect ratio of the columnar shape.

To solve the problem of reduced PM combustion efficiency due to the formation of a catalyst layer on the DPF wall surfaces and in the pores of the DPF walls, Patent Literature 3 proposes a method in which a spherical pore-forming agent, a columnar pore-forming agent, and an inorganic binder are added in respective predetermined amounts to a catalyst and mixed to form a slurry and a support is immersed into the slurry. However, there arises a problem in that the catalyst may enter microcracks in the DPF to increase the coefficient of thermal expansion. There also arises a problem of poor production efficiency of the catalyst-supported DPF.

CITATION LIST

Patent Literature

Patent Literature 1: JP-A-H01-249657
Patent Literature 2: JP-A-H09-29023
Patent Literature 3: JP-A-2009-663

SUMMARY OF INVENTION

Technical Problem

An object of the present invention is to provide an exhaust gas purification filter on which a catalyst is supported in a simple manner, without impregnation with a solution containing catalyst particles or application of the solution after the production of the exhaust gas purification filter, and which has a high PM combustion efficiency, a low coefficient of thermal expansion, and superior thermal resistance and to provide a method for producing the same.

Solution to Problem

The inventors conducted intensive studies to solve the above problems, thus found that, by sintering a green body made of a mixture of columnar aluminum titanate particles and a catalyst material, an exhaust gas purification filter is provided in which the catalyst is supported on the surface of the aluminum titanate and which has a high PM combustion efficiency, a low coefficient of thermal expansion, and superior thermal resistance, and completed the present invention. More specifically, the present invention provides the following.

An exhaust gas purification filter of the present invention is an exhaust gas purification filter formed by sintering columnar aluminum titanate particles whose surfaces have a catalyst material deposited thereon and which have an average aspect ratio (=number average major-axis length/number average minor-axis length) of 1.3 or more, wherein a catalyst made from the catalyst material by thermal treatment during the sintering is supported on the surface of the aluminum titanate.

A method for producing the exhaust gas purification filter of the present invention is a method that can produce the exhaust gas purification filter of the present invention and includes the steps of: producing columnar aluminum titanate particles having an average aspect ratio (=number average major-axis length/number average minor-axis length) of 1.3 or more; extruding a mixture containing the columnar aluminum titanate particles and the catalyst material to produce a filter green body; and thermally treating the filter green body to sinter the columnar aluminum titanate particles and concurrently thermally treating the catalyst material to form a catalyst, resulting in production of an exhaust gas purification filter in which the catalyst is supported on the surface of the aluminum titanate.

The average aspect ratio of the columnar aluminum titanate particles used in the present invention is more preferably 1.5 or more and the upper limit of the average aspect ratio is generally, but not necessarily limited to, 5 or less.

In the present invention, the number average minor-axis length of the columnar aluminum titanate particles is preferably 10 μm or less. The number average minor-axis length thereof is more preferably within the range of 5 to 10 μm. On the other hand, the number average major-axis length thereof is preferably within the range of 7 to 17 μm.

The number average major-axis length and number average minor-axis length of columnar aluminum titanate particles can be measured by a flow particle image analyzer, for example.

In the present invention, the catalyst to be supported on the surface of the aluminum titanate preferably contains a composite oxide containing: at least one metal of alkali metals and alkaline earth metals; and at least one of Al, Si, Ti, and Zr. Examples of the catalyst include, for example, those shown in Table 1 below.

TABLE 1

| Al-containing | Ti-containing | Al—Si-containing | Al—Ti-containing | Zr-containing |
|---|---|---|---|---|
| $MgAl_2O_4$ | $Mg_2TiO_4$ | $KAlSiO_4$ | $K_{1.5}Al_{1.5}Ti_{6.5}O_{16}$ | $SrZrO_3$ |
| $Sr_3Al_2O_6$ | $Sr_2TiO_4$ | $BaAl_2Si_2O_8$ | $SrAl_8Ti_3O_{19}$ | $CaZrO_3$ |
| $SrAl_2O_4$ | $Sr_3Ti_2O_7$ | $CaAl_2Si_2O_8$ | $Na_2Al_2Ti_6O_{16}$ | $BaZrO_3$ |
| $CaAl_2O_4$ | $SrTiO_3$ | $LiAlSiO_4$ | $CsAlTiO_4$ | $Na_2ZrO_3$ |
| | $Ba_2TiO_4$ | $CsAlSiO_4$ | | |
| | $Li_2TiO_3$ | $NaAlSiO_4$ | | |
| | $Li_4Ti_5O_{12}$ | $SrAl_2Si_2O_8$ | | |
| | | $NaAlSi_2O_6$ | | |
| | | $KAlSi_2O_6$ | | |
| | | $K_2Al_2SiO_6$ | | |
| | | $Na_nK_{1-n}AlSiO_4$ | | |

In the present invention, the catalyst can be formed by depositing the catalyst material on the surfaces of the columnar aluminum titanate particles and thermally treating the catalyst material by the thermal treatment during the sintering of the columnar aluminum titanate particles. Thus, the catalyst can be synthesized concurrently with the sintering of a green body for the exhaust gas purification filter of the present invention, so that the catalyst can be supported on the exhaust gas purification filter in a simple manner.

Therefore, the catalyst in the present invention should preferably be one which can be synthesized by the thermal treatment of the catalyst material at a lower temperature than the thermal treatment temperature during the sintering of the columnar aluminum titanate particles. The sintering temperature for columnar aluminum titanate particles is generally within the range of 1300° C. to 1600° C. For this reason, generally, it is preferred to select a catalyst and a catalyst material which can be synthesized at a temperature within the range of 1300° C. to 1600° C. and lower than during the thermal treatment for the sintering.

The exhaust gas purification filter of the present invention preferably has a porosity of 40% to 60%. If the porosity is less than 40%, secondary PM particles will be likely to clog the pores to increase the pressure loss, which is unfavorable. In addition, the clogging of pores deteriorates the contact between PM and the catalyst, which is unfavorable also in view of PM combustion. The porosity is more preferably 45% to 55%.

In the present invention, the coefficient of thermal expansion of the filter green body in a direction of the extrusion between 30° C. and 800° C. is preferably $1.0\times10^{-6}$/° C. or less and the c-axis crystal orientation ratio of the filter green body in the direction of the extrusion is preferably 0.7 or more. Since the coefficient of thermal expansion is $1.0\times10^{-6}$/° C. or less, the filter can have a property of superior thermal shock resistance. The coefficient of thermal expansion is more preferably $0.0\times10^{-6}$/° C. or less and the lower limit of the coefficient of thermal expansion is generally, but not necessarily limited to, $-2.0\times10^{-6}$/° C. or more.

Since the c-axis crystal orientation ratio in the direction of the extrusion is 0.7 or more, the coefficient of thermal expansion in the direction of extrusion can be small.

The c-axis crystal orientation ratio of the filter green body of the present invention in the direction of the extrusion can be determined from the following formula.

The $c$-axis crystal orientation ratio of the filter green body in the direction of extrusion=$A/(A+B)$ A: the degree of c-axis orientation of the filter green body in the direction of extrusion, $I_{002}/(I_{002}+I_{230})$ B: the degree of c-axis orientation of the filter green body in the vertical direction, $I_{002}/(I_{002}+I_{230})$ $I_{002}$ and $I_{230}$ represent the peak intensity ($I_{002}$) of the (002) plane and the peak intensity ($I_{230}$) of the (230) plane, respectively, wherein the extrusion surface of the filter green body is X-ray diffracted in respect of the degree of c-axis orientation in the direction of the extrusion or the vertical surface of the filter green body is X-ray diffracted in respect of the degree of c-axis orientation in the vertical direction.

In the columnar aluminum titanate particles in the present invention, the c-axis extends along the longitudinal direction of the columnar structure. Therefore, when the filter green body is formed by extrusion, the c-axes of crystals are aligned in the direction of extrusion. Thus, the coefficient of thermal expansion in the direction of extrusion can be small.

An example of a method for producing the columnar aluminum titanate particles in the present invention is a method including the steps of: mixing a source material containing a titanium source, an aluminum source, and a magnesium source while mechanochemically milling the source material; and firing the milled mixture.

By using a milled mixture obtained by mixing a source material containing a titanium source, an aluminum source, and a magnesium source while mechanochemically milling it and firing the milled mixture, columnar aluminum titanate particles having an average aspect ratio of 1.3 or more can be produced.

The temperature for firing the milled mixture is preferably within the temperature range of 1300° C. to 1600° C. By firing the milled mixture within this temperature range, the columnar aluminum titanate particles in the present invention can be more efficiently produced.

No particular limitation is placed on the firing time, but the firing is preferably performed for 0.5 to 20 hours.

An example of the mechanochemical milling is a method of milling the source material while giving it physical impact. A specific example thereof is milling using a vibration mill. It can be considered that by performing a milling process using a vibration mill, a disorder of atomic arrangement and a reduction of interatomic distance are concurrently caused by shear stress due to frictional grinding of the powder mixture, and this causes atom transfer at contact points between different kinds of particles, resulting in the formation of a metastable phase. Thus, a high reaction activity milled mixture is obtained. By firing the high reaction activity milled mixture, the columnar aluminum titanate particles in the present invention can be produced.

The mechanochemical milling is performed in a dry process using neither water nor solvent.

No particular limitation is placed on the time of mixing involved in the mechanochemical milling, but it is generally preferably within the range of 0.1 to 6 hours.

The source material for the columnar aluminum titanate particles used in the present invention preferably contains a titanium source, an aluminum source, and a magnesium source. Examples of the titanium source that can be used include compounds containing titanium oxide, and specific examples thereof include titanium oxide, rutile ores, wet cake of titanium hydroxide, and aqueous titania.

Examples of the aluminum source that can be used include compounds that can produce aluminum oxide by heat application, and specific examples thereof include aluminum oxide, aluminum hydroxide, and aluminum sulfate. Of these, aluminum oxide is particularly preferably used.

The mixing ratio of the titanium source and the aluminum source is basically Ti:Al=1:2 (in molar ratio). However, a change of plus or minus about 10% in content of each source will present no problem.

Examples of the magnesium source that can be used include compounds that can produce magnesium oxide by heat application, and specific examples thereof include magnesium hydroxide, magnesium oxide, and magnesium carbonate. Of these, magnesium hydroxide and magnesium oxide are particularly preferably used.

The magnesium source is preferably contained in the source material to give a content of 0.5% to 2.0% by weight relative to the total amount of the titanium source and the aluminum source in terms of their respective oxides. If the magnesium content is below 0.5% by weight, a sintered body having a low coefficient of thermal expansion and high mechanical strength may not be able to be obtained. On the other hand, if the magnesium content is above 2.0% by weight, columnar aluminum titanate particles having an average aspect ratio of 1.3 or more may not be able to be obtained.

Furthermore, in the method for producing the aluminum titanate particles in the present invention, a silicon source may be further contained in the source material.

By containing a silicon source in the source material, the decomposition of aluminum titanate can be reduced, whereby columnar aluminum titanate particles superior in high-temperature stability can be produced.

Examples of the silicon source include silicon oxide and silicon. Of these, silicon oxide is particularly preferably used. The content of the silicon source in the source material is preferably within the range of 0.5% to 10% by weight relative to the total amount of the titanium source and the aluminum source in terms of their respective oxides. If the content of the silicon source is within the above range, columnar aluminum titanate particles can be more stably produced.

The mixture containing the columnar aluminum titanate particles and the catalyst material can be prepared, for example, with the addition of a pore-forming agent, a binder, a dispersant, and water. The exhaust gas purification filter can be produced by forming the mixture into a green body providing a honeycomb structure, for example, by using an extruder, sealing one of two end openings of each cell of the honeycomb structure so that the cell end openings at each end of the honeycomb structure give a checkered pattern, drying the green body and then firing the obtained green body. The firing temperature is, for example, 1300° C. to 1600° C. The firing time is, for example, one to five hours.

Examples of the catalyst material include mixtures containing: at least one compound of alkali metal salts and alkaline earth metal salts; and at least one of an aluminum source, a silicon source, a titanium source, and a zirconium source.

Examples of the alkali metal include lithium, sodium, potassium, rubidium, cesium, and francium. Examples of the alkali earth metal include magnesium, calcium, strontium, barium, and radium.

The alkali metal salts include alkali metal carbonates; alkali metal hydrogen carbonates; alkali metal hydroxides; alkali metal organic acid salts, such as alkali metal acetates; alkali metal sulfates; and alkali metal nitrates, but the preferred alkali metal salts are alkali metal carbonates.

The alkaline earth metal salts include alkaline earth metal carbonates; alkaline earth metal hydrogen carbonates; alkaline earth metal hydroxides; alkaline earth metal organic acid salts, such as alkaline earth metal acetates; alkaline earth metal sulfates; and alkaline earth metal nitrates, but the preferred alkaline earth metal salts are alkaline earth metal carbonates.

Examples of the aluminum source that can be used include compounds that can produce aluminum oxide by heat application, and specific examples thereof include aluminum oxide, aluminum hydroxide, and aluminum sulfate. Of these, aluminum hydroxide is particularly preferably used.

Examples of the silicon source include silicon oxide and silicon. Of these, silicon oxide is particularly preferably used.

Examples of the titanium source that can be used include compounds containing titanium oxide, and specific examples thereof include titanium oxide, rutile ores, wet cake of titanium hydroxide, and aqueous titania. Examples of the zirconium source include zirconium oxide, zirconium carbonate hydrate, and zirconium sulfate hydrate, but the preferred is zirconium oxide.

The catalyst material is preferably compounded into 100 parts by weight of columnar aluminum titanate particles to produce 5 to 100 parts by weight of catalyst. More preferably, the catalyst material is compounded into it to produce 5 to 50 parts by weight of catalyst. If the amount of catalyst is more than 100 parts by weight, pores may be clogged to decrease the PM combustion efficiency. If the amount of catalyst is less than 5 parts by weight, the effects due to the use of the catalyst may not be able to be obtained.

Examples of the pore-forming agent include graphite, wood powder, and polyethylene. Examples of the binder include methylcellulose, ethylcellulose, and polyvinyl alcohol. Examples of the dispersant include fatty acid soap and ethylene glycol. The amounts of pore-forming agent, binder, dispersant, and water can be appropriately controlled.

Advantageous Effects of Invention

In the present invention, by the use of columnar aluminum titanate particles, the coefficient of thermal expansion of the exhaust gas purification filter can be further reduced and the strength of the exhaust gas purification filter can be increased. In addition, a large number of interconnected pores can be formed in the wall surfaces and walls of the exhaust gas filter, resulting in increased PM combustion efficiency.

By sintering an exhaust gas purification filter green body made of columnar aluminum titanate particles and a catalyst material, a catalyst can be supported on the surface of the aluminum titanate.

The catalyst supported on the surface of the aluminum titanate based on the present invention is strongly bonded to the aluminum titanate and therefore can reduce the occurrence of peel-off of the catalyst. In addition, since it can be avoided to clog the pores in the exhaust gas purification filter made of columnar aluminum titanate particles, this results in increased PM combustion efficiency. Furthermore, since the catalyst is synthesized concurrently with the sintering of the green body, the catalyst can be supported without entering microcracks in the sintered body, so that the exhaust gas purification filter can maintain a low coefficient of thermal expansion.

Since in the exhaust gas purification filter of the present invention both of the catalyst and aluminum titanate as the support have superior thermal resistance, the exhaust gas purification filter can prevent the catalyst from being deteriorated owing to high temperatures during abnormal combustion. Furthermore, since the exhaust gas purification filter can combust PM from when it is still at low temperature, it can increase fuel economy.

DESCRIPTION OF EMBODIMENTS

Hereinafter, the present invention will be described with reference to specific examples, but is not limited by the following examples.

Production Method of Columnar Aluminum Titanate Particles

Production Example 1

An amount of 360.0 g of titanium oxide, 411.1 g of aluminum oxide, 9.7 g of magnesium hydroxide, and 19.0 g of silicon oxide were mixed for 2.0 hours while being milled by a vibration mill.

An amount of 500 g of the milled mixture powder obtained in the above manner was packed into a crucible and then fired at 1500° C. for four hours in an electric furnace. When the resultant product was identified in terms of crystal phase by X-ray diffractometry, it was found to be $Al_2TiO_5$.

Furthermore, the obtained product was observed in terms of shape with a scanning electron microscope (SEM) and measured, by flow particle image analysis, in terms of aspect ratio (=number average major-axis length/number average minor-axis length). Table 2 shows the composition, shape, number average major-axis length, number average minor-axis length, and aspect ratio.

Figure 1:
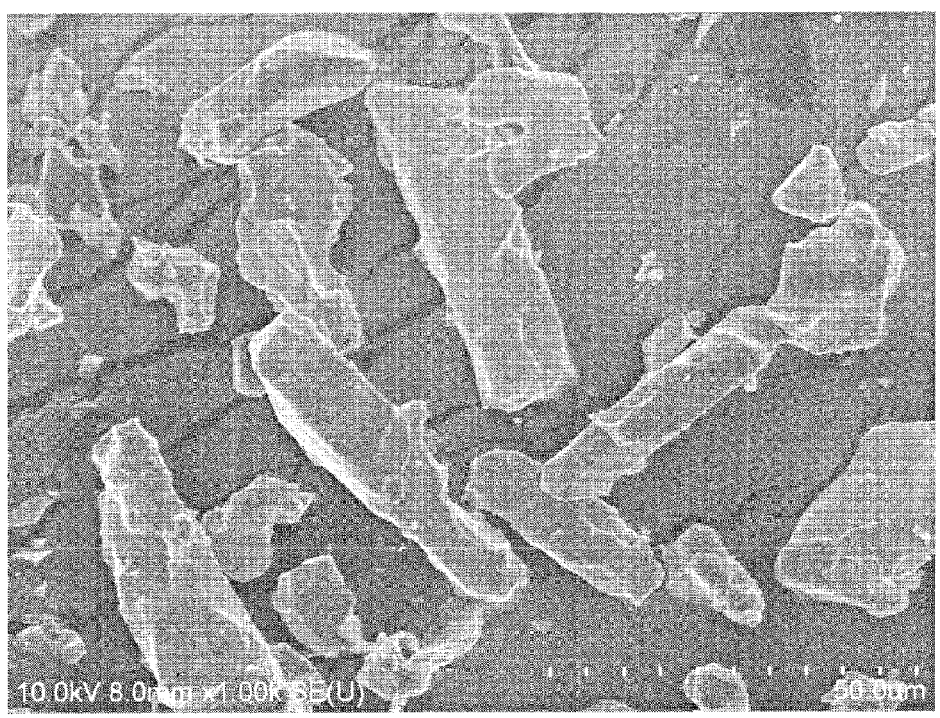
FIG. 1 is a SEM photograph showing columnar aluminum titanate particles obtained in Production Example 1 according to the present invention.

FIG. 1 is a SEM photograph showing columnar aluminum titanate particles obtained in this production example.

Figure 13:
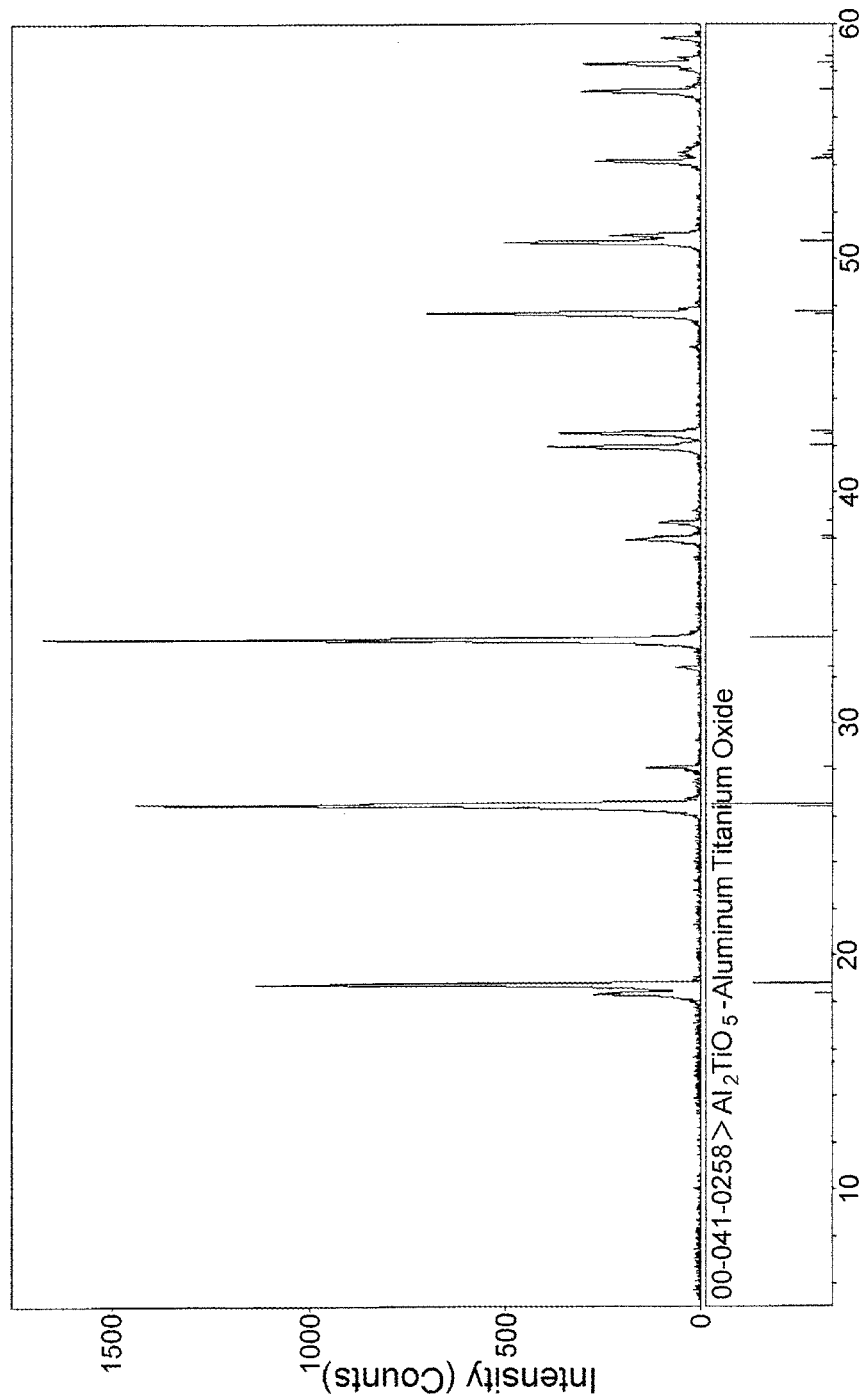
FIG. 13 is a graph showing an X-ray diffraction pattern chart of the columnar aluminum titanate particles obtained by Production Example 1 according to the present invention.

FIG. 13 is a graph showing an X-ray diffraction pattern chart of the columnar aluminum titanate particles obtained in this production example.

Production Example 2

An amount of 354.7 g of titanium oxide, 405.0 g of aluminum oxide, 21.3 g of magnesium hydroxide, and 19.0 g of silicon oxide were mixed for 2.0 hours while being milled by a vibration mill.

An amount of 500 g of the milled mixture powder obtained in the above manner was packed into a crucible and then fired at 1500° C. for four hours in an electric furnace. When the resultant product was identified in terms of crystal phase by X-ray diffractometry, it was found to be $Al_2TiO_5$.

Furthermore, the obtained product was observed in terms of shape with a scanning electron microscope (SEM) and measured, by flow particle image analysis, in terms of aspect ratio (=number average major-axis length/number average minor-axis length). Table 2 shows the composition, shape, number average major-axis length, number average minor-axis length, and aspect ratio.

Production Method of Granular Aluminum Titanate Particles

Production Example 3

An amount of 340.1 g of titanium oxide, 388.3 g of aluminum oxide, 52.6 g of magnesium hydroxide, and 19.0 g of silicon oxide were mixed for 2.0 hours while being milled by a vibration mill.

An amount of 500 g of the milled mixture powder obtained in the above manner was packed into a crucible and then fired at 1500° C. for four hours in an electric furnace. When the resultant product was identified in terms of crystal phase by X-ray diffractometry, it was found to be $Al_2TiO_5$.

Furthermore, the obtained product was observed in terms of shape with a scanning electron microscope (SEM) and measured, by flow particle image analysis, in terms of aspect ratio (=number average major-axis length/number average minor-axis length). Table 2 shows the composition, shape, number average major-axis length, number average minor-axis length, and aspect ratio.

Figure 2:
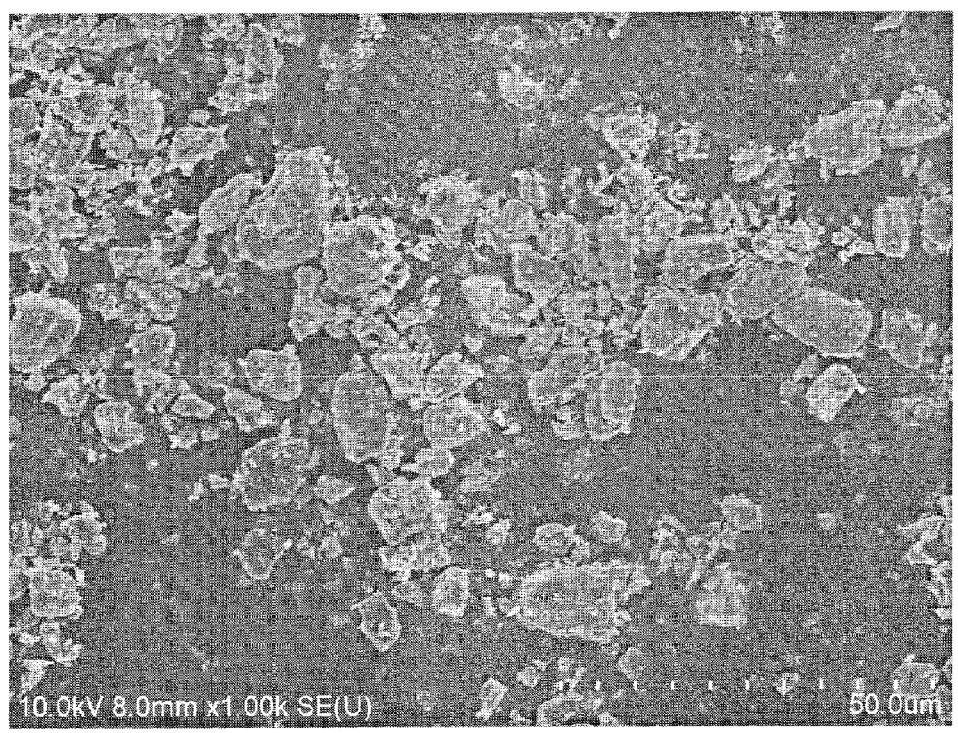
FIG. 2 is a SEM photograph showing granular aluminum titanate particles obtained in Production Example 3 as a comparison.

FIG. 2 is a SEM photograph showing granular aluminum titanate particles obtained in this production example.

Table 2 shows the respective compositions, shapes, major-axis lengths (number average major-axis lengths), minor-axis lengths (number average minor-axis lengths), and aspect ratios of the aluminum titanate produces obtained in Production Examples 1 to 3.

TABLE 2

| | Composition | Shape | Major-Axis Length (μm) | Minor-Axis Length (μm) | Aspect Ratio |
|---|---|---|---|---|---|
| Production Ex. 1 | $Al_2TiO_5$ | columnar | 15.8 | 8.9 | 1.8 |
| Production Ex. 2 | $Al_2TiO_5$ | columnar | 11.7 | 8.7 | 1.3 |
| Production Ex. 3 | $Al_2TiO_5$ | granular | 12.2 | 11.6 | 1.1 |

As shown in Table 2, aluminum titanate products obtained in Production Examples 1 and 2 are columnar aluminum titanate particles having an aspect ratio of 1.3 or more. On the other hand, an aluminum titanate product obtained in Production Example 3 is granular aluminum titanate particles having an aspect ratio of below 1.3.

Production of Sintered Honeycomb Body

Using the aluminum titanate products obtained in Production Examples 1 to 3, sintered honeycomb bodies were produced in the following manners.

Example 1

Compounded into 80 parts by weight of the columnar aluminum titanate particles obtained in Production Example 1 were a catalyst material (containing 3.3 parts by weight of sodium carbonate, 4.85 parts by weight of aluminum hydroxide, and 14.9 parts by weight of titanium oxide), 20 parts by weight of graphite, 10 parts by weight of methylcellulose, and 0.5 parts by weight of fatty acid soap. A suitable amount of water was also added to the mixture and the mixture was then kneaded to obtain an extrudable clay.

The obtained clay was extruded and formed into a honeycomb structure by an extruder to obtain a filter green body. The cell density of the die used for this production example was, in any case, 300 cells/inch² (46.5 cells/cm²) and the partition thickness was 500 μm.

Prepared was a slurry the solid of which was made of the columnar aluminum titanate particles and the catalyst material as described above and to which an additive, such as a viscosity modifier, was added. The slurry was applied in some of the cells of the filter green body having a honeycomb structure to seal some of the cell openings so that the open cells and sealed cells of the honeycomb structure gave a checkered pattern.

Next, the filter green body was dried by a hot-air dryer and the obtained green body was then fired at 1450° C. for an hour to obtain a sintered honeycomb body. When the resultant sintered honeycomb body was identified in terms of crystal phase by X-ray diffractometry, it was found to have a crystal phase of $Al_2TiO_5$ and a crystal phase of $Na_2Al_2Ti_6O_{16}$.

Figure 14:
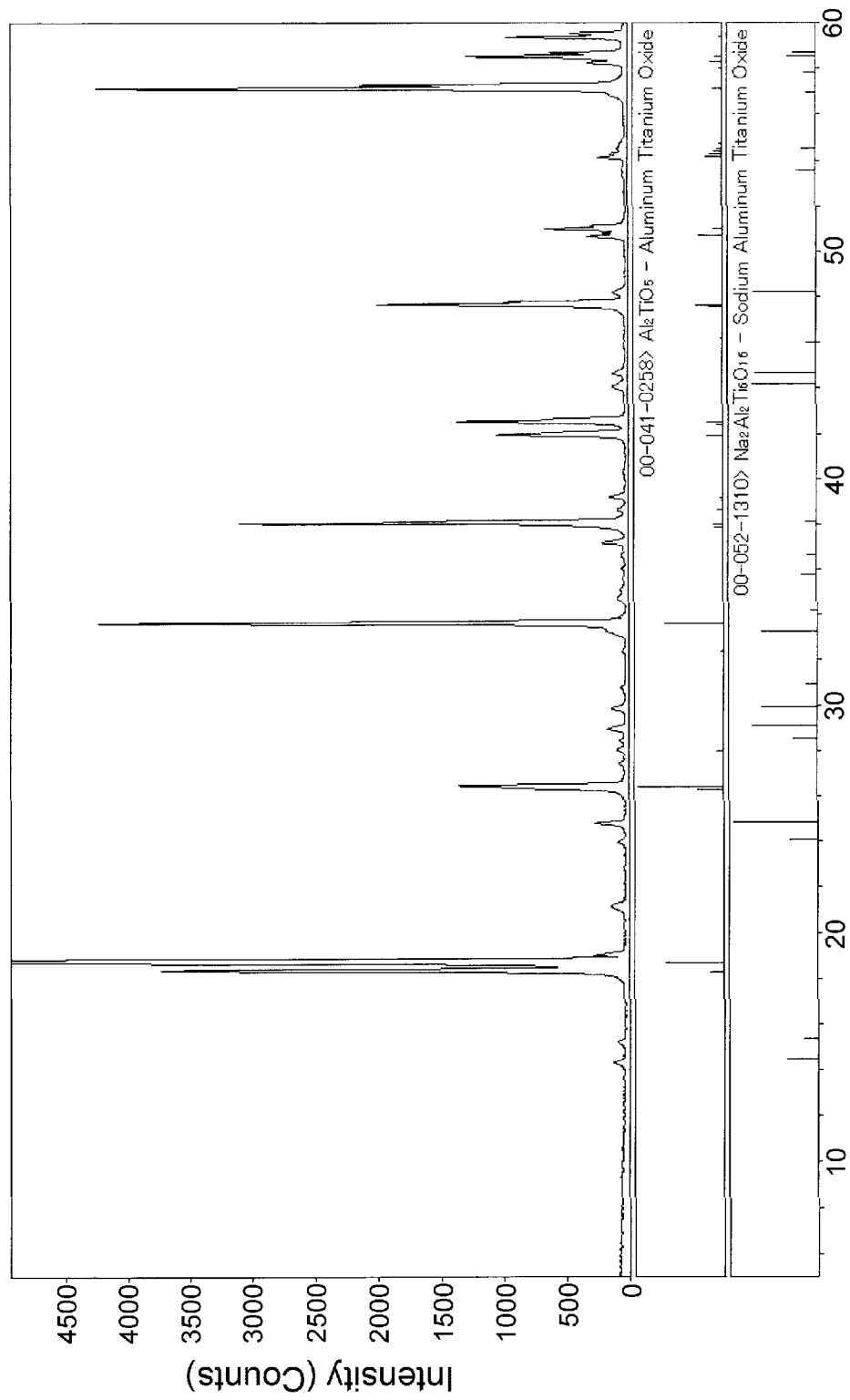
FIG. 14 is a graph showing an X-ray diffraction pattern chart of a sintered honeycomb body obtained in Example 1 according to the present invention.

FIG. 14 is a graph showing an X-ray diffraction pattern chart of the sintered honeycomb body obtained in this example.

Example 2

A sintered honeycomb body was obtained in the same manner as in Example 1 except that the catalyst material was changed to one containing 12.0 parts by weight of cesium carbonate, 5.74 parts by weight of aluminum hydroxide, and 5.88 parts by weight of titanium oxide. When the resultant sintered honeycomb body was identified in terms of crystal phase by X-ray diffractometry, it was found to have a crystal phase of $Al_2TiO_5$ and a crystal phase of $CsAlTiO_4$.

Figure 15:
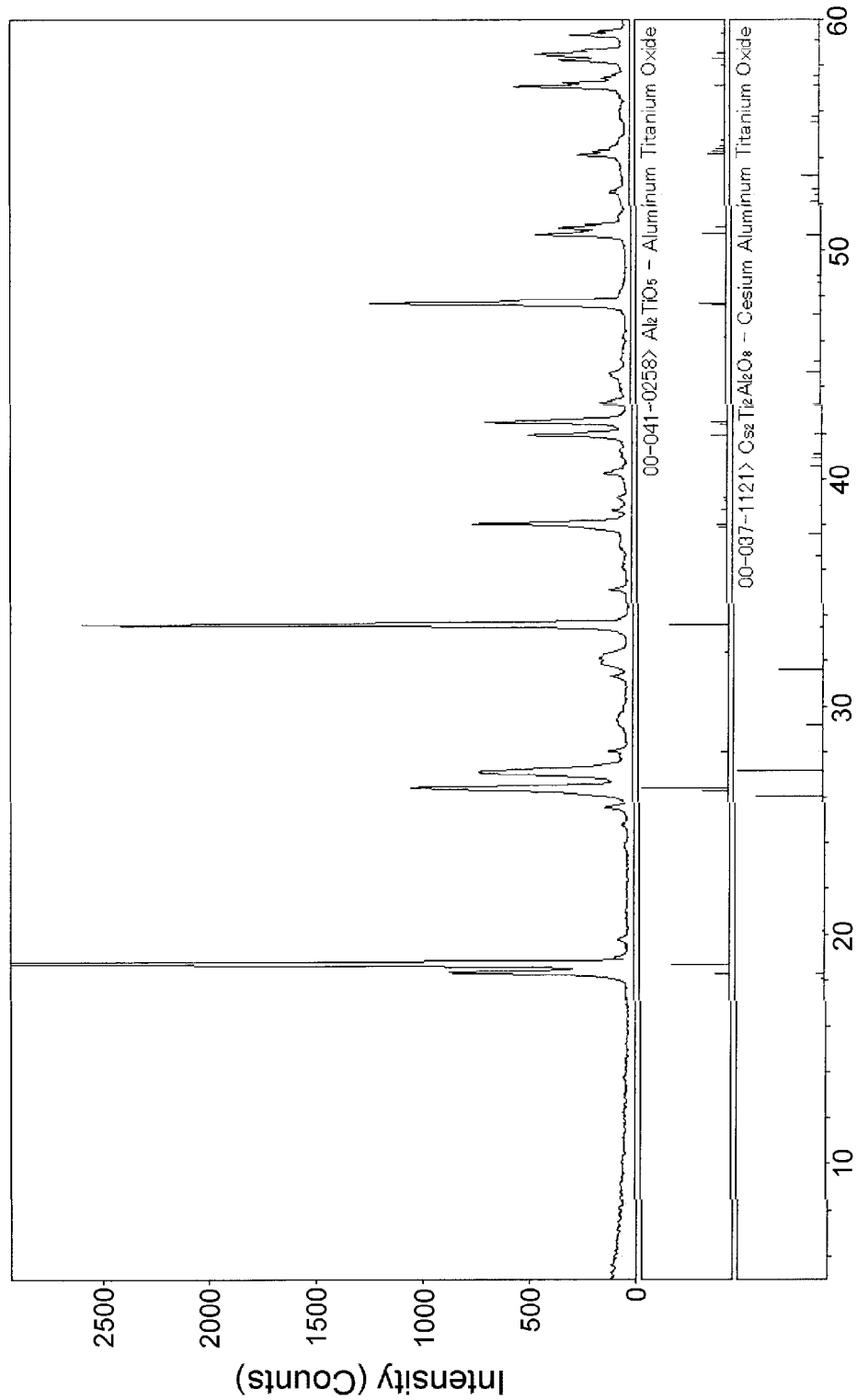
FIG. 15 is a graph showing an X-ray diffraction pattern chart of a sintered honeycomb body obtained in Example 2 according to the present invention.

FIG. 15 is a graph showing an X-ray diffraction pattern chart of the sintered honeycomb body obtained in this example.

Example 3

A sintered honeycomb body was obtained in the same manner as in Example 1 except that the catalyst material was changed to one containing 7.46 parts by weight of sodium carbonate, 10.98 parts by weight of aluminum hydroxide, and 8.46 parts by weight of silicon oxide. When the resultant sintered honeycomb body was identified in terms of crystal phase by X-ray diffractometry, it was found to have a crystal phase of $Al_2TiO_5$ and a crystal phase of $NaAlSiO_4$.

Figure 16:
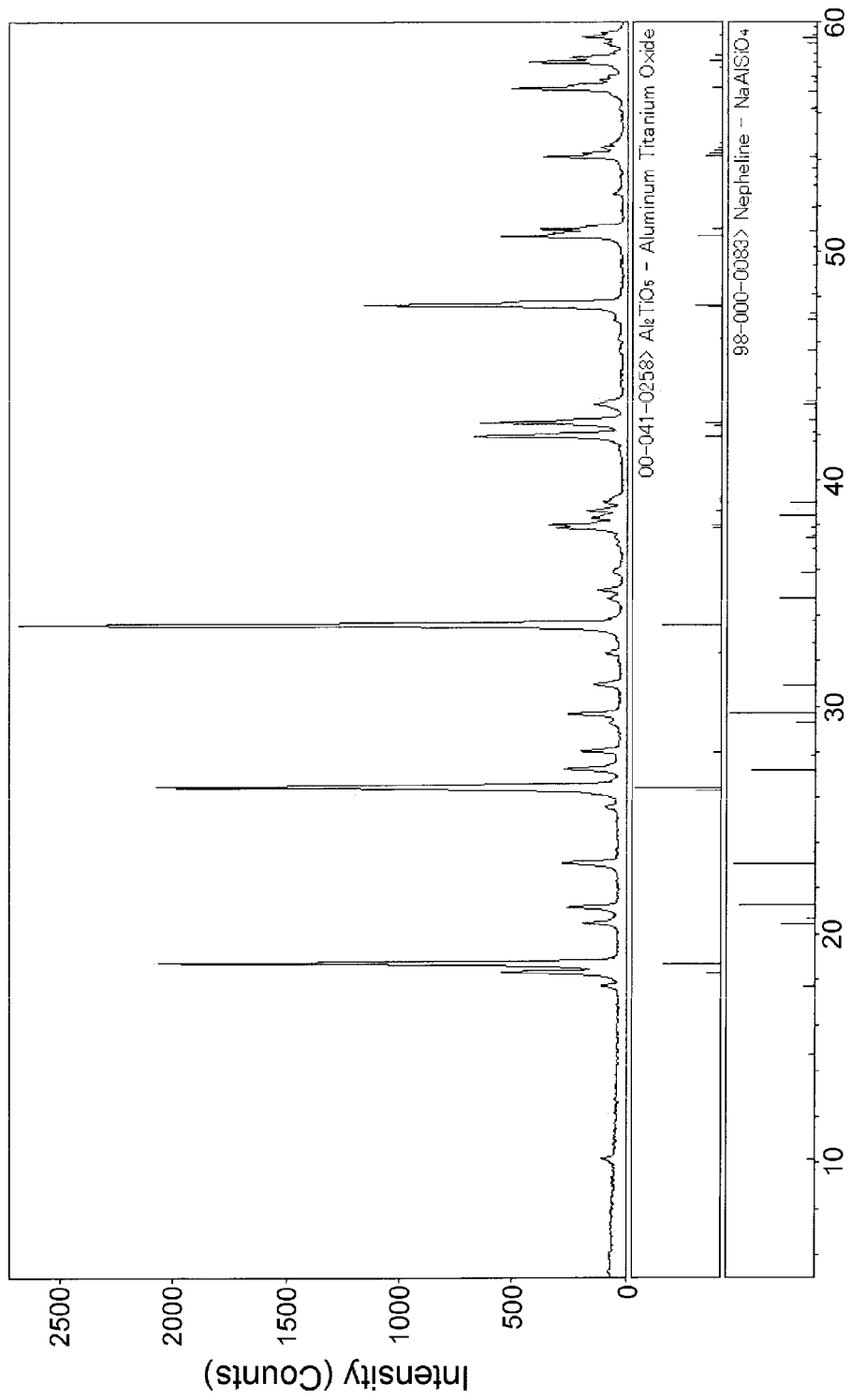
FIG. 16 is a graph showing an X-ray diffraction pattern chart of the sintered honeycomb body obtained in Example 3 according to the present invention.

FIG. 16 is a graph showing an X-ray diffraction pattern chart of the sintered honeycomb body obtained in this example.

Figure 3:
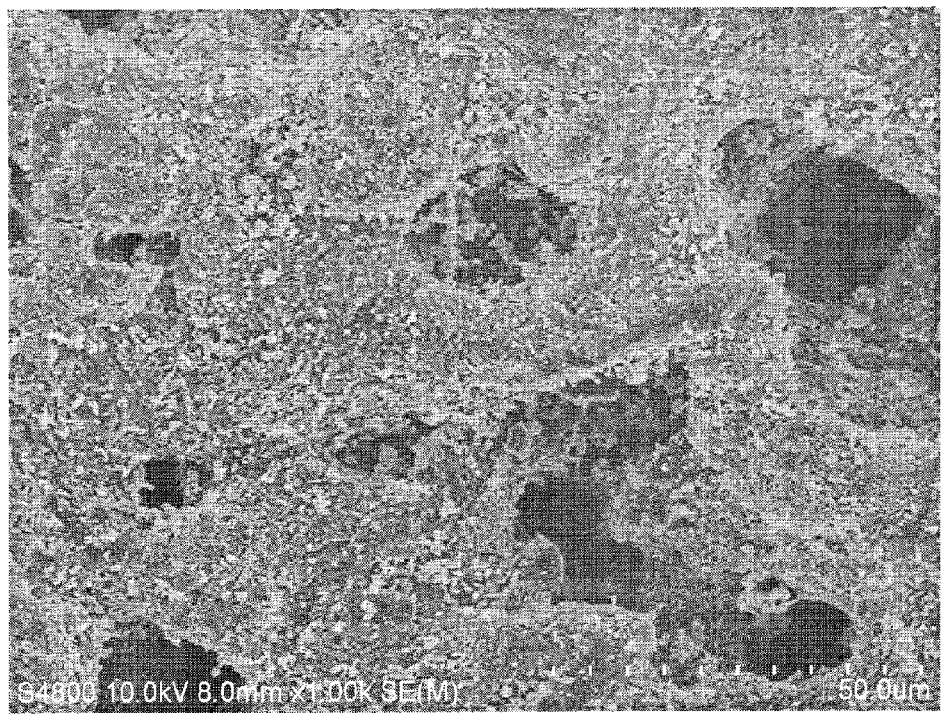
FIG. 3 is a SEM photograph showing a sintered honeycomb body obtained in Example 3 according to the present invention.

FIG. 3 is a SEM photograph showing the sintered honeycomb body obtained in this example.

Example 4

A sintered honeycomb body was obtained in the same manner as in Example 1 except that the catalyst material was changed to one containing 9.06 parts by weight of strontium carbonate, 9.58 parts by weight of aluminum hydroxide, and 7.38 parts by weight of silicon oxide. When the resultant sintered honeycomb body was identified in terms of crystal phase by X-ray diffractometry, it was found to have a crystal phase of $Al_2TiO_5$ and a crystal phase of $SrAl_2Si_2O_8$.

Figure 17:
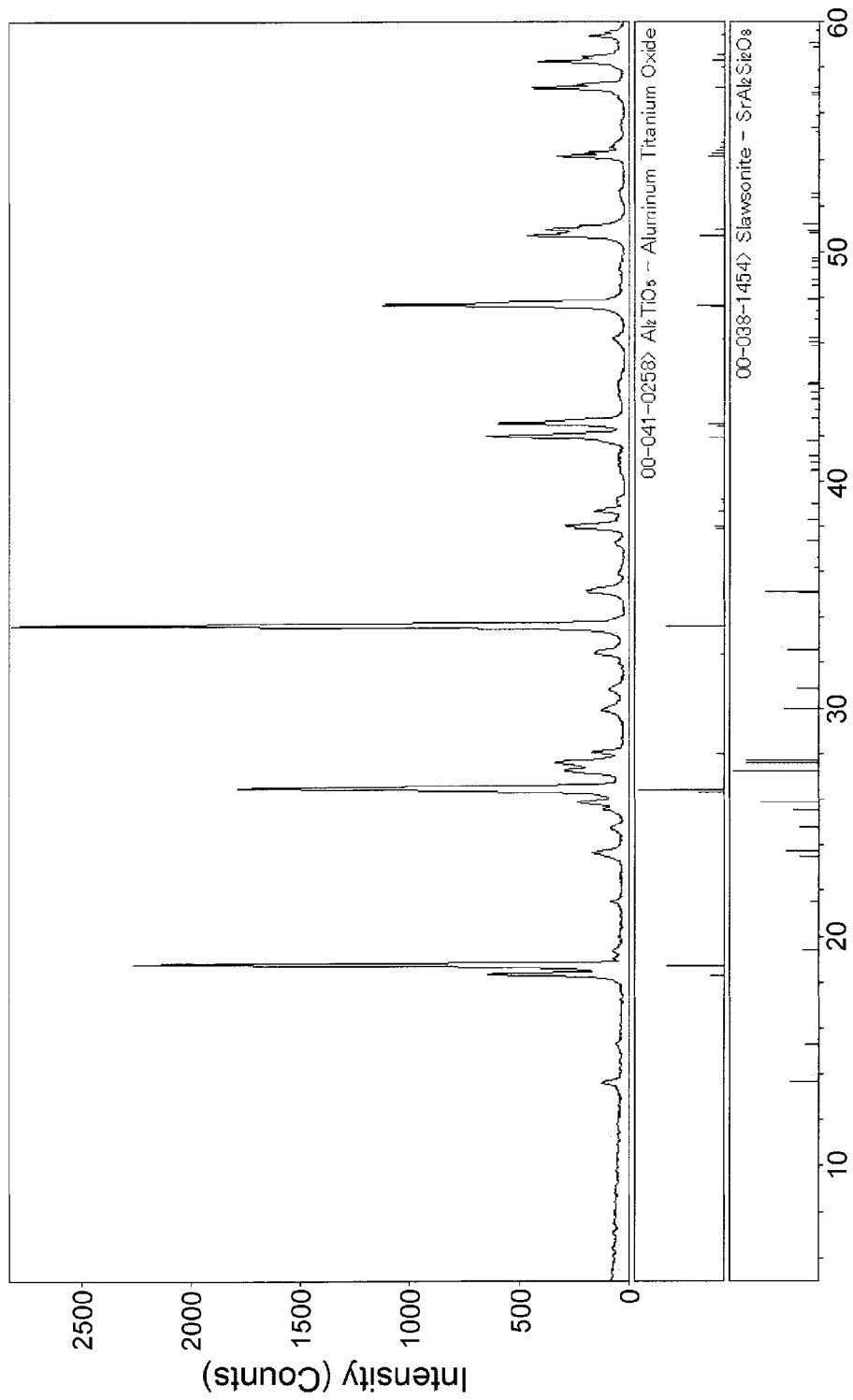
FIG. 17 is a graph showing an X-ray diffraction pattern chart of a sintered honeycomb body obtained in Example 4 according to the present invention.

FIG. 17 is a graph showing an X-ray diffraction pattern chart of the sintered honeycomb body obtained in this example.

Example 5

A sintered honeycomb body was obtained in the same manner as in Example 1 except that the catalyst material was changed to one containing 8.74 parts by weight of potassium carbonate, 9.86 parts by weight of aluminum hydroxide, and 7.60 parts by weight of silicon oxide. When the resultant sintered honeycomb body was identified in terms of crystal phase by X-ray diffractometry, it was found to have a crystal phase of $Al_2TiO_5$ and a crystal phase of $KAlSiO_4$.

Figure 18:
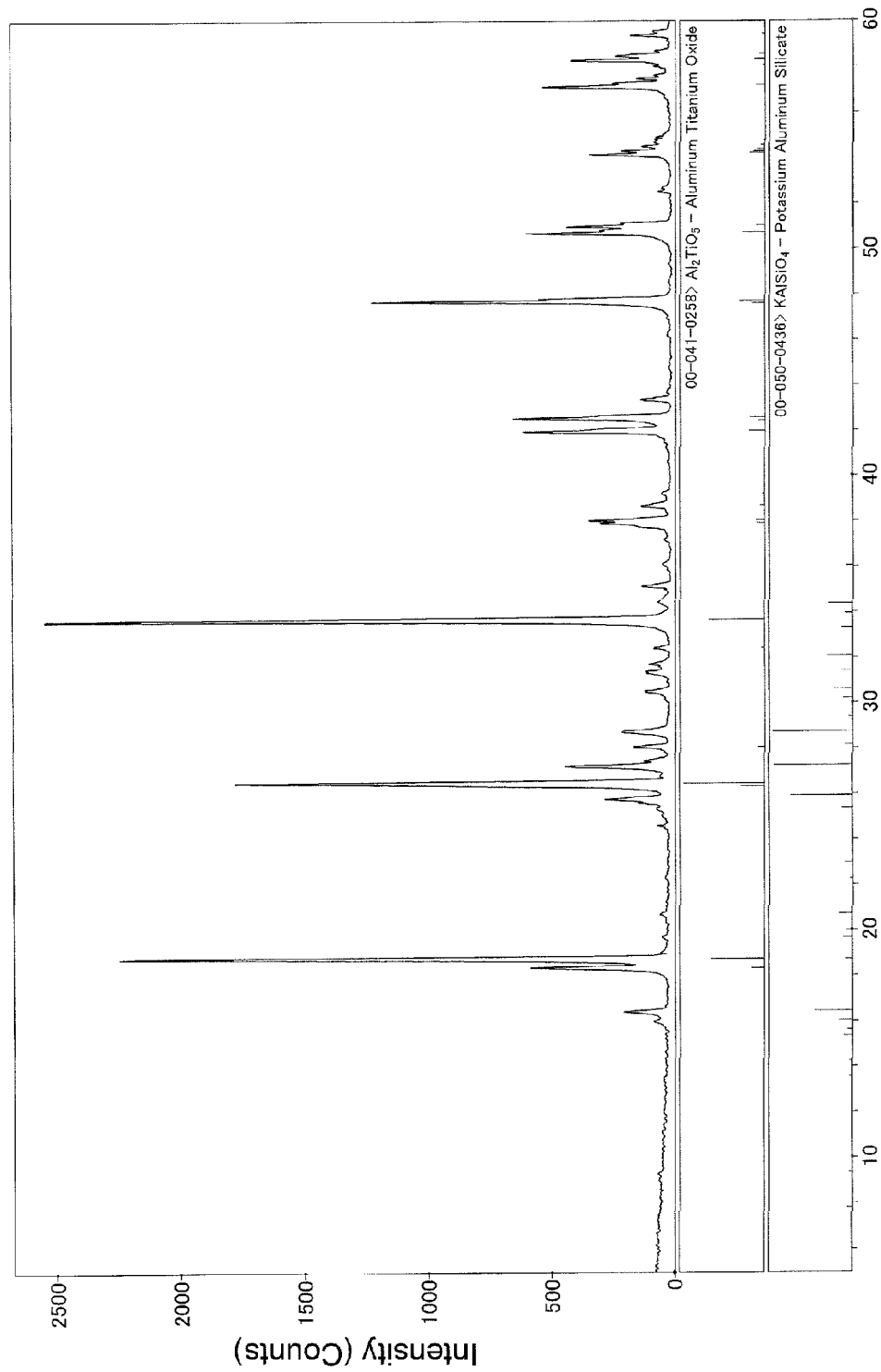
FIG. 18 is a graph showing an X-ray diffraction pattern chart of a sintered honeycomb body obtained in Example 5 according to the present invention.

FIG. 18 is a graph showing an X-ray diffraction pattern chart of the sintered honeycomb body obtained in this example.

Example 6

A sintered honeycomb body was obtained in the same manner as in Example 1 except that the catalyst material was changed to one containing 3.53 parts by weight of sodium carbonate, 4.60 parts by weight of potassium carbonate, 10.39 parts by weight of aluminum hydroxide, and 8.01 parts by weight of silicon oxide. When the resultant sintered honeycomb body was identified in terms of crystal phase by X-ray diffractometry, it was found to have a crystal phase of $Al_2TiO_5$ and a crystal phase of $Na_{0.5}K_{0.5}AlSiO_4$.

Example 7

A sintered honeycomb body was obtained in the same manner as in Example 1 except that the catalyst material was changed to one containing 1.37 parts by weight of sodium carbonate, 7.14 parts by weight of potassium carbonate, 10.07 parts by weight of aluminum hydroxide, and 7.76 parts by weight of silicon oxide. When the resultant sintered honeycomb body was identified in terms of crystal phase by X-ray diffractometry, it was found to have a crystal phase of $Al_2TiO_5$ and a crystal phase of $Na_{0.2}K_{0.8}AlSiO_4$.

Example 8

A sintered honeycomb body was obtained in the same manner as in Example 1 except that the catalyst material was changed to one containing 5.84 parts by weight of sodium carbonate, 1.90 parts by weight of potassium carbonate, 10.74 parts by weight of aluminum hydroxide, and 8.27 parts by weight of silicon oxide. When the resultant sintered honeycomb body was identified in terms of crystal phase by X-ray diffractometry, it was found to have a crystal phase of $Al_2TiO_5$ and a crystal phase of $Na_{0.8}K_{0.2}AlSiO_4$.

Example 9

A sintered honeycomb body was obtained in the same manner as in Example 1 except that the amount of the columnar aluminum titanate particles obtained in the Production Example 1 was changed to 90 parts by weight and the catalyst material was changed to one containing 1.65 parts by weight of sodium carbonate, 2.43 parts by weight of aluminum hydroxide, and 7.45 parts by weight of titanium oxide. When the resultant sintered honeycomb body was identified in terms of crystal phase by X-ray diffractometry, it was found to have a crystal phase of $Al_2TiO_5$ and a crystal phase of $Na_2Al_2Ti_6O_{16}$.

Example 10

A sintered honeycomb body was obtained in the same manner as in Example 1 except that the amount of the columnar aluminum titanate particles obtained in the Production Example 1 was changed to 60 parts by weight and the catalyst material was changed to one containing 6.6 parts by weight of sodium carbonate, 9.7 parts by weight of aluminum hydroxide, and 29.8 parts by weight of titanium oxide. When the resultant sintered honeycomb body was identified in terms of crystal phase by X-ray diffractometry, it was found to have a crystal phase of $Al_2TiO_5$ and a crystal phase of $Na_2Al_2Ti_6O_{16}$.

Example 11

A sintered honeycomb body was obtained in the same manner as in Example 1 except that the firing temperature for the green body was changed to 1350° C. When the resultant sintered honeycomb body was identified in terms of crystal phase by X-ray diffractometry, it was found to have a crystal phase of $Al_2TiO_5$ and a crystal phase of $Na_2Al_2Ti_6O_{16}$.

Example 12

Compounded into 80 parts by weight of the columnar aluminum titanate particles obtained in Production Example 2 were a catalyst material (containing 3.3 parts by weight of sodium carbonate, 4.85 parts by weight of aluminum hydroxide, and 14.9 parts by weight of titanium oxide), 20 parts by weight of graphite, 10 parts by weight of methylcellulose, and 0.5 parts by weight of fatty acid soap. A suitable amount of water was also added to the mixture and the mixture was then kneaded to obtain an extrudable clay.

The obtained clay was extruded and formed into a honeycomb structure by an extruder to obtain a filter green body. The cell density of the die used for this production example was, in any case, 300 cells/inch$^2$ (46.5 cells/cm$^2$) and the partition thickness was 500 µm.

Prepared was a slurry the solid of which was made of the columnar aluminum titanate particles and the catalyst material as described above and to which an additive, such as a viscosity modifier, was added. The slurry was applied in some of the cells of the green body having a honeycomb structure to seal some of the cell openings so that the open cells and sealed cells of the honeycomb structure gave a checkered pattern.

Next, the filter green body was dried by a hot-air dryer and the obtained green body was then fired at 1450° C. for an hour to obtain a sintered honeycomb body. When the resultant sintered honeycomb body was identified in terms of crystal phase by X-ray diffractometry, it was found to have a crystal phase of $Al_2TiO_5$ and a crystal phase of $Na_2Al_2Ti_6O_{16}$.

Example 13

A sintered honeycomb body was obtained in the same manner as in Example 12 except that the catalyst material was changed to one containing 12.0 parts by weight of cesium carbonate, 5.74 parts by weight of aluminum hydroxide, and 5.88 parts by weight of titanium oxide. When the resultant sintered honeycomb body was identified in terms of crystal phase by X-ray diffractometry, it was found to have a crystal phase of $Al_2TiO_5$ and a crystal phase of $CsAlTiO_4$.

Example 14

A sintered honeycomb body was obtained in the same manner as in Example 12 except that the catalyst material was changed to one containing 7.46 parts by weight of sodium carbonate, 10.98 parts by weight of aluminum hydroxide, and 8.46 parts by weight of silicon oxide. When the resultant sintered honeycomb body was identified in terms of crystal phase by X-ray diffractometry, it was found to have a crystal phase of $Al_2TiO_5$ and a crystal phase of $NaAlSiO_4$.

Example 15

A sintered honeycomb body was obtained in the same manner as in Example 12 except that the catalyst material was changed to one containing 9.06 parts by weight of strontium carbonate, 9.58 parts by weight of aluminum hydroxide, and 7.38 parts by weight of silicon oxide. When the resultant sintered honeycomb body was identified in terms of crystal phase by X-ray diffractometry, it was found to have a crystal phase of $Al_2TiO_5$ and a crystal phase of $SrAl_2Si_2O_8$.

Examples 16 to 19

To evaluate the thermal resistance of the sintered honeycomb bodies obtained in Examples 1 to 4, the sintered honeycomb bodies obtained in Examples 1 to 4 were fired (aged) at 1000° C. for four hours to obtain sintered honeycomb bodies of Examples 16 to 19.

Comparative Example 1

Compounded into 80 parts by weight of the granular aluminum titanate particles obtained in Production Example 3 were a catalyst material (containing 3.3 parts by weight of sodium carbonate, 4.85 parts by weight of aluminum hydroxide, and 14.9 parts by weight of titanium oxide), 20 parts by weight of graphite, 10 parts by weight of methylcellulose, and 0.5 parts by weight of fatty acid soap. A suitable amount of water was also added to the mixture, and the mixture was then kneaded to obtain an extrudable clay.

The obtained clay was extruded and formed into a honeycomb structure by an extruder to obtain a filter green body. The cell density of the die used for this production example was, in any case, 300 cells/inch$^2$ (46.5 cells/cm$^2$) and the partition thickness was 500 µm.

Prepared was a slurry the solid of which was made of the granular aluminum titanate particles and the catalyst material as described above and to which an additive, such as a viscosity modifier, was added. The slurry was applied in some of the cells of the green body having a honeycomb structure to seal some of the cell openings so that the open cells and sealed cells of the honeycomb structure gave a checkered pattern.

Next, the filter green body was dried by a hot-air dryer and the obtained green body was then fired at 1450° C. for an hour to obtain a sintered honeycomb body. When the resultant sintered honeycomb body was identified in terms of crystal phase by X-ray diffractometry, it was found to have a crystal phase of $Al_2TiO_5$ and a crystal phase of $Na_2Al_2Ti_6O_{16}$.

Comparative Example 2

Compounded into 100 parts by weight of the columnar aluminum titanate particles obtained in Production Example 1 were parts by weight of graphite, 10 parts by weight of methylcellulose, and 0.5 parts by weight of fatty acid soap. A suitable amount of water was also added to the mixture and the mixture was then kneaded to obtain an extrudable clay.

The obtained clay was extruded and formed into a honeycomb structure by an extruder to obtain a green body. The cell density of the die used for this production example was, in any case, 300 cells/inch$^2$ (46.5 cells/cm$^2$) and the partition thickness was 500 µm.

Prepared was a slurry the solid of which was made of the columnar aluminum titanate particles as described above and to which an additive, such as a viscosity modifier, was added. The slurry was applied in some of the cells of the green body having a honeycomb structure to seal some of the cell openings so that the open cells and sealed cells of the honeycomb structure gave a checkered pattern.

Next, the filter green body was dried by a hot-air dryer and the obtained green body was then fired at 1450° C. for an hour to obtain a sintered honeycomb body.

Figure 4:
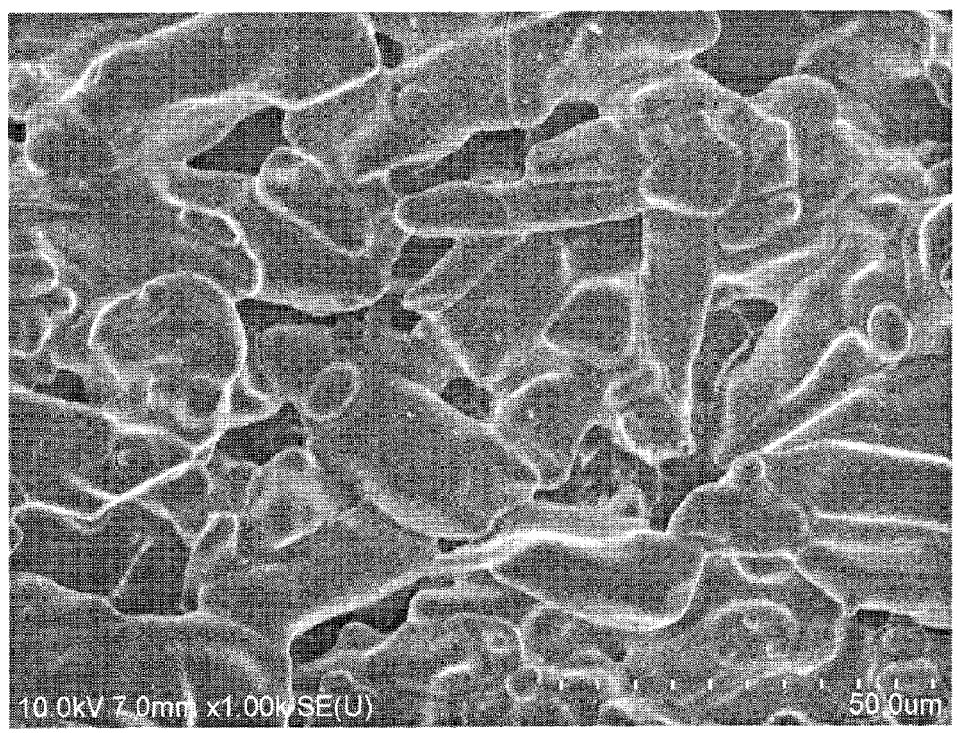
FIG. 4 is a SEM photograph showing a sintered honeycomb body obtained in Comparative Example 2.

FIG. 4 is a SEM photograph showing the sintered honeycomb body obtained in this comparative example.

Comparative Example 3

An amount of 30 g of γ-alumina (manufactured by Wako Pure Chemical Industries, Ltd.) was added to and mixed with 6.0 g of 5% by weight solution of diamminedinitro platinum (II) nitrate and the mixture was evaporated to dryness to support platinum on γ-alumina.

This product was ground in a mortar and thermally treated at 500° C. for an hour in the atmospheric environment in an electric furnace to obtain platinum-supported alumina powder.

The obtained platinum-supported alumina powder, water, and a binder were mixed to obtain a slurry. The sintered honeycomb body obtained in Comparative Example 2 was wash-coated with the slurry by sucking the slurry into the sintered honeycomb body and removing surplus slurry by air blowing. The sintered honeycomb body was dried and then thermally treated at 500° C. for an hour in the atmospheric environment in an electric furnace.

Comparative Examples 4 to 6

To evaluate the thermal resistance of the sintered honeycomb bodies obtained in Comparative Examples 1 to 3, the sintered honeycomb bodies obtained in Comparative Examples 1 to 3 were fired (aged) at 1000° C. for four hours to obtain sintered honeycomb bodies of Comparative Examples 4 to 6.

Evaluation of Sintered Honeycomb Body

Each of the obtained sintered honeycomb bodies was measured in terms of porosity, bending strength, coefficient of thermal expansion, degree of crystal orientation, initial pressure loss, PM combustion onset temperature, and DPF regeneration rate in the following manners.

(Porosity)

Figure 5:
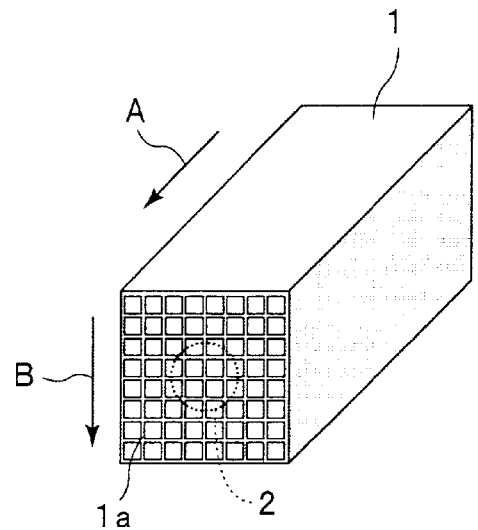
FIG. 5 is a perspective view showing a sintered honeycomb body.

FIG. 5 is a perspective view showing a sintered honeycomb body. As shown in FIG. 5, the sintered honeycomb body 1 has eight by eight cells and its end surface 1a has a size of 1.8 cm by 1.8 cm. The arrow A represents a direction of extrusion and the arrow B represents a direction perpendicular to the direction of extrusion A.

A measurement sample for porosity was obtained by cutting, out of a central portion 2 of the above sintered honeycomb body 1 made up of eight by eight cells, a portion thereof corresponding to two by two cells to give a length of approximately 2 cm along the direction of extrusion A.

Figure 6:
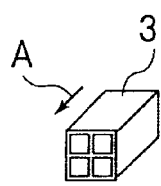
FIG. 6 is a perspective view showing a sample for measuring the porosity of the sintered honeycomb body.

FIG. 6 is a perspective view showing the measurement sample 3. Each sintered honeycomb body was measured, using the measurement sample 3 shown in FIG. 6, in term of porosity in conformity with JIS R1634. The results are shown in Table 3.

(Bending Strength)

Figure 7:
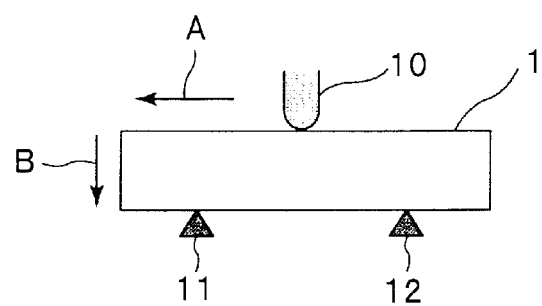
FIG. 7 is a schematic view illustrating a method for measuring the bending strength of the sintered honeycomb body.

As shown in FIG. 7, each sintered honeycomb body was measured in terms of bending strength in conformity with JIS R1601 by pressing a pressing rod 10 against a midportion of the sintered honeycomb body 1 of eight by eight cells with the sintered honeycomb body 1 supported at bearing points 11 and 12. The results are shown in Table 3.

(Coefficient of Thermal Expansion)

Figure 8:
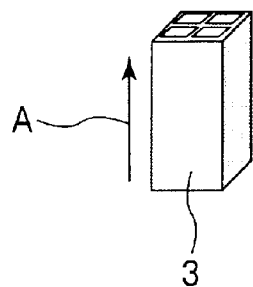
FIG. 8 is a perspective view showing a measurement sample for the coefficient of thermal expansion of the sintered honeycomb body.

In the same manner as in the measurement sample 3 for porosity described with reference to FIGS. 5 and 6, a measurement sample 3 was obtained by cutting, out of a central portion 2 of the sintered honeycomb body 1 made up of eight by eight cells, a portion thereof to give a length of approximately 2 cm along the direction of extrusion A. As shown in FIG. 8, each measurement sample 3 was measured in terms of coefficient of thermal expansion in the direction of extrusion A in conformity with JIS R1618. The results are shown in Table 3.

(Crystal Orientation Ratio)

The c-axis crystal orientation ratios of the obtained sintered honeycomb bodies were measured as crystal orientation ratios thereof.

The crystal orientation ratio was calculated from the degree of crystal orientation in the direction of extrusion and the degree of crystal orientation in the direction perpendicular to the direction of extrusion (degree of crystal orientation in the vertical direction), as shown in the following formula.

Crystal orientation ratio=degree of crystal orientation in the direction of extrusion/[(degree of crystal orientation in the direction of extrusion)+(degree of crystal orientation in the vertical direction)]

The degree of crystal orientation was determined by X-ray diffractometry. The degree of crystal orientation in the direction of extrusion was determined by measurement of X-ray diffraction of the extrusion surface of each sintered honeycomb body and calculation from the measured diffraction intensity of the (002) plane (=I(002)) and the measured diffraction intensity of the (230) plane (=I(230)) using the following formula.

Degree of crystal orientation=$I(002)/\{I(002)+I(230)\}$

The degree of crystal orientation in the vertical direction was determined by measurement of X-ray diffraction of the vertical surface of each sintered honeycomb body and calculation from I(002) and I(230) in the same manner as above.

Note that he diffraction intensity of the (002) plane is a peak appearing near 50.8° 2θ and the diffraction intensity of the (230) plane is a peak appearing near 33.7° 2θ.

Figure 9:
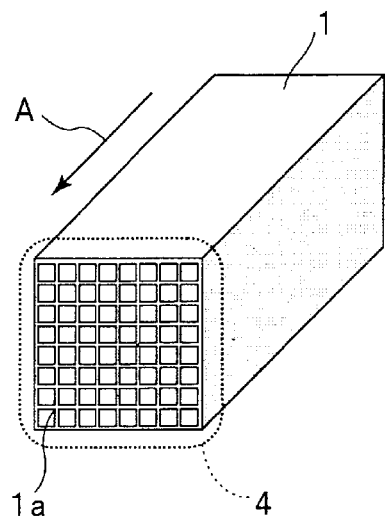
FIG. 9 is a perspective view illustrating production of a measurement sample for measuring X-ray diffraction of an extrusion surface of the sintered honeycomb body.
Figure 10:
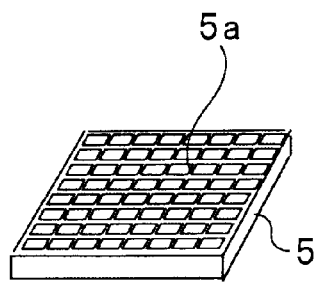
FIG. 10 is a perspective view showing the measurement sample for measuring X-ray diffraction of the extrusion surface of the sintered honeycomb body.

FIGS. 9 and 10 are perspective views illustrating the production of a measurement sample for measuring X-ray diffraction of the extrusion surface.

As shown in FIG. 9, a region 4 of the sintered honeycomb body 1 including the end surface 1a was cut out to produce a measurement sample shown in FIG. 10. Using the measurement sample 5 shown in FIG. 10, the extrusion surface 5a of this measurement sample 5 was measured in terms of X-ray diffraction.

Figure 11:
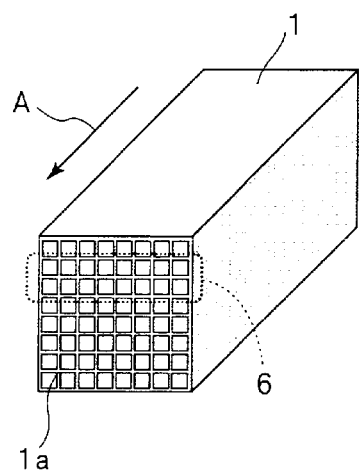
FIG. 11 is a perspective view illustrating production of a measurement sample for measuring X-ray diffraction of a vertical surface of the sintered honeycomb body.
Figure 12:
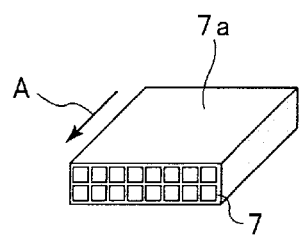
FIG. 12 is a perspective view showing the measurement sample for measuring X-ray diffraction of the vertical surface of the sintered honeycomb body.

FIGS. 11 and 12 are perspective views illustrating the production of a measurement sample for measuring X-ray diffraction of the vertical surface, i.e., the surface perpendicular to the extrusion surface.

As shown in FIG. 11, a region 6 of the sintered honeycomb body 1 corresponding to eight by two cells was cut out along the direction of extrusion A to obtain a measurement sample 7 shown in FIG. 12. The surface (extrusion surface) 7a of this measurement sample 7 extending along the direction of extrusion A was measured in terms of X-ray diffraction.

The crystal orientation ratio of each sintered honeycomb body was calculated in the above manner. The results are shown in Table 3.

Note that the (002) plane is a plane perpendicular to the c-axis and a high intensity of the (002) plane means that the c-axis is oriented.

(PM Combustion Onset Temperature)

Each sintered honeycomb body was ground in a mortar and 10% by weight carbon black (TOKABLACK #7100F manufactured by Tokai carbon Co., Ltd.) was added as pseudo-PM to the ground product and mixed together in the mortar.

The obtained mixture was measured in terms of TG/DTA using a thermal analyzer (a thermal analyzer EXSTAR6000 TG/DTA6300 manufactured by Seiko Instruments Inc.) under the conditions of a temperature rise of 10° C./min, an atmosphere of dry air at a rate of 200 ml/min, and a sample amount of 5 mg to determine the onset temperature of TG reduction due to combustion of the carbon black. The results are shown in Table 3.

(Initial Pressure Loss and DPF Regeneration Rate)

Furthermore, the sintered honeycomb bodies of the above Examples and Comparative Examples were subjected to a DPF regeneration performance test using a diesel engine.

The procedure of regeneration rate measurement using the DPF regeneration performance test was as follows: The initial weight of each sintered honeycomb body (DPF) was previously measured and an oxidation catalyst (DOC) and the sintered honeycomb body were placed in this order in an exhaust line of the diesel engine. Next, the diesel engine was started and its exhaust flow rate was then stably kept at 500 Nm$^3$/h. In this state, the pressures near the gas inlet and outlet of the sintered honeycomb body in the exhaust pipe were measured to determine the initial pressure loss of the sintered honeycomb body. Then, a specific amount (approximately 8 g/L) of PM was deposited on the sintered honeycomb body under the operating condition in which the exhaust temperature becomes low, the sintered honeycomb body was then removed from the exhaust line, and the weight of PM deposited was measured.

Next, the sintered honeycomb body was placed back again and the accelerator opening of the diesel engine was then controlled to raise the internal temperature of the sintered honeycomb body to 520° C. For 30 minutes after the internal temperature reached 520° C., the sintered honeycomb body was held at a temperature of 530° C.±10° C. Subsequently, the sintered honeycomb body was brought to an idling state in two minutes.

The sintered honeycomb body was removed again and its weight reduction (i.e., amount of PM combusted) was measured.

The regeneration rate was determined by the following calculation formula:

Regeneration rate (%)=100−[{(weight of PM deposited (g))−(weight of PM combusted (g))}/weight of PM deposited (g)]×100.

The results of initial pressure losses and DPF regeneration rates are shown in Table 3.

TABLE 3

| | Base Material | | | Catalyst | | Physical Properties of Sintered Honeycomb Body | | |
|---|---|---|---|---|---|---|---|---|
| | Composition | Shape (μm) | Aspect Ratio | Composition | Aging | Porosity (%) | Bending Strength (MPa) | CTE ($\times 10^{-6}$/° C.) |
| Ex. 1 | $Al_2TiO_5$ | columnar | 1.8 | $Na_2Al_2Ti_6O_{16}$ | — | 50.8 | 3.8 | −1.5 |
| Ex. 2 | $Al_2TiO_5$ | columnar | 1.8 | $CsAlTiO_4$ | — | 49.8 | 3.9 | −1.4 |
| Ex. 3 | $Al_2TiO_5$ | columnar | 1.8 | $NaAlSiO_4$ | — | 50.2 | 3.4 | −1.5 |
| Ex. 4 | $Al_2TiO_5$ | columnar | 1.8 | $SrAl_2Si_2O_8$ | — | 48.9 | 3.5 | −1.3 |
| Ex. 5 | $Al_2TiO_5$ | columnar | 1.8 | $KAlSiO_4$ | — | 50.5 | 3.4 | −1.2 |
| Ex. 6 | $Al_2TiO_5$ | columnar | 1.8 | $Na_{0.5}K_{0.5}AlSiO_4$ | — | 48.0 | 3.6 | −1.3 |
| Ex. 7 | $Al_2TiO_5$ | columnar | 1.8 | $Na_{0.2}K_{0.8}AlSiO_4$ | — | 47.8 | 3.4 | −1.2 |
| Ex. 8 | $Al_2TiO_5$ | columnar | 1.8 | $Na_{0.8}K_{0.2}AlSiO_4$ | — | 48.5 | 3.5 | −1.2 |
| Ex. 9 | $Al_2TiO_5$ | columnar | 1.8 | $Na_2Al_2Ti_6O_{16}$ | — | 51.2 | 3.6 | −1.5 |
| Ex. 10 | $Al_2TiO_5$ | columnar | 1.8 | $Na_2Al_2Ti_6O_{16}$ | — | 46.1 | 4.3 | −0.8 |
| Ex. 11 | $Al_2TiO_5$ | columnar | 1.8 | $Na_2Al_2Ti_6O_{16}$ | — | 58.3 | 2.1 | 0.1 |
| Ex. 12 | $Al_2TiO_5$ | columnar | 1.3 | $Na_2Al_2Ti_6O_{16}$ | — | 48.6 | 3.5 | −1.0 |
| Ex. 13 | $Al_2TiO_5$ | columnar | 1.3 | $CsAlTiO_4$ | — | 47.2 | 3.5 | −0.9 |
| Ex. 14 | $Al_2TiO_5$ | columnar | 1.3 | $NaAlSiO_4$ | — | 47.1 | 3.0 | −0.8 |
| Ex. 15 | $Al_2TiO_5$ | columnar | 1.3 | $SrAl_2Si_2O_8$ | — | 47.3 | 3.2 | −0.9 |

TABLE 3-continued

| | | | | | | | | |
|---|---|---|---|---|---|---|---|---|
| Ex. 16 | Al$_2$TiO$_5$ | columnar | 1.8 | Na$_2$Al$_2$Ti$_6$O$_{16}$ | done | 50.7 | 3.8 | −1.5 |
| Ex. 17 | Al$_2$TiO$_5$ | columnar | 1.8 | CsAlTiO$_4$ | done | 49.8 | 3.9 | −1.4 |
| Ex. 18 | Al$_2$TiO$_5$ | columnar | 1.8 | NaAlSiO$_4$ | done | 50.0 | 3.4 | −1.5 |
| Ex. 19 | Al$_2$TiO$_5$ | columnar | 1.8 | SrAl$_2$Si$_2$O$_8$ | done | 48.7 | 3.5 | −1.3 |
| Comp. Ex. 1 | Al$_2$TiO$_5$ | granular | 1.1 | Na$_2$Al$_2$Ti$_6$O$_{16}$ | — | 46.5 | 3.4 | 2.5 |
| Comp. Ex. 2 | Al$_2$TiO$_5$ | columnar | 1.8 | — | — | 50.2 | 3.8 | −1.5 |
| Comp. Ex. 3 | Al$_2$TiO$_5$ | columnar | 1.8 | Pt | — | 42.2 | 3.6 | 3.2 |
| Comp. Ex. 4 | Al$_2$TiO$_5$ | granular | 1.1 | Na$_2$Al$_2$Ti$_6$O$_{16}$ | done | 46.5 | 3.4 | 2.5 |
| Comp. Ex. 5 | Al$_2$TiO$_5$ | columnar | 1.8 | — | done | 50.1 | 3.8 | −1.5 |
| Comp. Ex. 6 | Al$_2$TiO$_5$ | columnar | 1.8 | Pt | done | 41.1 | 3.4 | 3.3 |

| | Physical Properties of Sintered Honeycomb Body | | | Evaluation of DPF Performance | | |
|---|---|---|---|---|---|---|
| | Degree of Crystal Orientation in Extrusion Direction A $I_{002}/(I_{002} + I_{230})$ | Degree of Crystal Orientation in Vertical Direction B $I_{002}/(I_{002} + I_{230})$ | Crystal Orientation Ratio A/(A + B) | Initial Pressure Loss (kPa) | PM Combustion Onset Temperature (° C.) | DPF Regeneration Rate (%) |
| Ex. 1 | 0.78 | 0.12 | 0.87 | 1.88 | 472 | 95 |
| Ex. 2 | 0.80 | 0.09 | 0.90 | 1.84 | 522 | 85 |
| Ex. 3 | 0.80 | 0.10 | 0.89 | 1.78 | 518 | 88 |
| Ex. 4 | 0.78 | 0.09 | 0.90 | 1.91 | 527 | 83 |
| Ex. 5 | 0.77 | 0.10 | 0.89 | 1.80 | 510 | 88 |
| Ex. 6 | 0.80 | 0.09 | 0.90 | 2.00 | 495 | 91 |
| Ex. 7 | 0.76 | 0.11 | 0.87 | 1.98 | 503 | 90 |
| Ex. 8 | 0.79 | 0.12 | 0.87 | 2.12 | 509 | 90 |
| Ex. 9 | 0.80 | 0.12 | 0.87 | 2.04 | 498 | 89 |
| Ex. 10 | 0.78 | 0.10 | 0.89 | 2.23 | 460 | 96 |
| Ex. 11 | 0.51 | 0.21 | 0.71 | 1.43 | 475 | 95 |
| Ex. 12 | 0.51 | 0.18 | 0.74 | 2.20 | 475 | 95 |
| Ex. 13 | 0.50 | 0.18 | 0.74 | 2.24 | 528 | 83 |
| Ex. 14 | 0.50 | 0.20 | 0.71 | 2.21 | 521 | 86 |
| Ex. 15 | 0.48 | 0.20 | 0.71 | 2.11 | 525 | 85 |
| Ex. 16 | 0.78 | 0.12 | 0.87 | 1.70 | 472 | 96 |
| Ex. 17 | 0.80 | 0.09 | 0.90 | 1.84 | 530 | 82 |
| Ex. 18 | 0.80 | 0.10 | 0.89 | 1.81 | 519 | 88 |
| Ex. 19 | 0.78 | 0.09 | 0.90 | 1.89 | 529 | 82 |
| Comp. Ex. 1 | 0.32 | 0.30 | 0.52 | 3.14 | 475 | 93 |
| Comp. Ex. 2 | 0.80 | 0.10 | 0.89 | 1.91 | 600 | 43 |
| Comp. Ex. 3 | 0.80 | 0.12 | 0.87 | 3.52 | 521 | 82 |
| Comp. Ex. 4 | 0.32 | 0.30 | 0.52 | 3.02 | 475 | 93 |
| Comp. Ex. 5 | 0.80 | 0.10 | 0.89 | 1.86 | 600 | 43 |
| Comp. Ex. 6 | 0.80 | 0.12 | 0.87 | 3.49 | 590 | 45 |

As shown in Table 3, the sintered honeycomb bodies (exhaust gas purification filters) of Examples 1 to 19 according to the present invention exhibit low coefficients of thermal expansion, high porosities, low PM combustion onset temperatures, and superior DPF regeneration rates. The reason for this is that a catalyst is supported on the surfaces of columnar aluminum titanate particles having an aspect ratio of 1.3 or more. Since there is no need for coating of catalyst on the sintered honeycomb body, it can be avoided that the catalyst enters microcracks to increase the coefficient of thermal expansion. Furthermore, since each sintered honeycomb body exhibits a high porosity and a low PM combustion onset temperature, it can prevent pressure loss of exhaust gas upon deposition of PM. Therefore, an exhaust gas purification filter can be provided which has a high PM combustion efficiency and a high DPF regeneration rate.

The sintered honeycomb bodies shown in Examples 16 to according to the present invention reveals that their coefficient of thermal expansion, porosity, and PM combustion onset temperature did not vary from those of the sintered honeycomb bodies before being aged (Examples 1 to 4), which shows that the exhaust gas purification filter of the present invention has superior thermal resistance. As seen from Comparative Example 1, with the use of granular aluminum titanate particles having an aspect ratio of below 1.3, a low coefficient of thermal expansion cannot be achieved.

As seen from Comparative Example 3, if the catalyst is applied to a sintered body by coating, a high porosity and a low coefficient of linear expansion cannot be achieved. The reason for this is that the catalyst enters pores or microcracks in the sintered body.

As seen from Comparative Example 6, this sintered honeycomb body exhibits a low porosity, a high coefficient of thermal expansion, and a high PM combustion onset temperature as compared with the sintered honeycomb body before being aged (Comparative Example 3). This is because the catalyst applied thereto by coating has low thermal resistance.

Therefore, the present invention can provide an exhaust gas purification filter on which a catalyst is supported in a simple manner and which has a high PM combustion efficiency, a low coefficient of thermal expansion, superior thermal resistance, and superior DPF regeneration rate.

REFERENCE SIGNS LIST

1 . . . sintered honeycomb body (honeycomb structure)
1a . . . end surface of honeycomb structure
2 . . . central portion of honeycomb structure
3 . . . measurement sample cut out of honeycomb structure
4 . . . region of honeycomb structure near end surface
5 . . . sample for measuring X-ray diffraction of extrusion surface of honeycomb structure
5a . . . extrusion surface
6 . . . region of eight by two cells of honeycomb structure
7 . . . sample for measuring X-ray diffraction of vertical surface of honeycomb structure
7a . . . vertical surface

The invention claimed is:

1. An exhaust gas purification filter formed by sintering columnar aluminum titanate particles whose surfaces have a catalyst material deposited thereon and which have an average aspect ratio (=number average major-axis length/number average minor-axis length) of 1.3 or more,
wherein a catalyst made from the catalyst material by thermal treatment during the sintering is supported on the surface of the aluminum titanate.

2. The exhaust gas purification filter according to claim 1, wherein the catalyst contains a composite oxide containing: at least one metal of alkali metals and alkaline earth metals; and at least one of Al, Si, Ti, and Zr.

3. The exhaust gas purification filter according to claim 1, wherein the exhaust gas purification filter is made by sintering a filter green body formed by extrusion and the coefficient of thermal expansion of the exhaust gas purification filter in a direction of the extrusion between 30° C. and 800° C. is $1.0 \times 10^{-6}$/° C. or less.

4. The exhaust gas purification filter according to claim 1, wherein the exhaust gas purification filter is made by sintering a filter green body formed by extrusion and the c-axis crystal orientation ratio of the exhaust gas purification filter in the direction of the extrusion is 0.7 or more.

5. The exhaust gas purification filter according to claim 1, wherein the exhaust gas purification filter has a porosity of 40% to 60%.

6. A method for producing the exhaust gas purification filter according to claim 1, the method comprising the steps of:
producing columnar aluminum titanate particles having an average aspect ratio (=number average major-axis length/number average minor-axis length) of 1.3 or more;
extruding a mixture containing the columnar aluminum titanate particles and the catalyst material to produce a filter green body; and
thermally treating the filter green body to sinter the columnar aluminum titanate particles and concurrently thermally treating the catalyst material to form a catalyst, resulting in production of an exhaust gas purification filter in which the catalyst is supported on the surface of the aluminum titanate.

7. The method for producing the exhaust gas purification filter according to claim 6, wherein the catalyst material contains: at least one compound of alkali metal salts and alkaline earth metal salts; and at least one of an aluminum source, a silicon source, a titanium source, and a zirconium source.

* * * * *